United States Patent [19]

Shenn

[11] Patent Number: 4,941,507
[45] Date of Patent: Jul. 17, 1990

[54] WATER PRESSURE-SEALING FAUCET WITHOUT WATER HAMMER EFFECT

[76] Inventor: Chung-Shan Shenn, 32, Hoping Road, Hu Wei Town, Yun Lin Hsien, Taiwan

[21] Appl. No.: 338,730
[22] Filed: Apr. 14, 1989
[51] Int. Cl.⁵ ............................................. F16K 11/02
[52] U.S. Cl. ........................... 137/625.37; 137/614.11; 137/625.49
[58] Field of Search ........... 137/625.3, 625.49, 625.37, 137/614.11; 251/121, 122

[56] References Cited

U.S. PATENT DOCUMENTS

| | | | |
|---|---|---|---|
| 2,013,822 | 9/1935 | Bradbury | 137/625.3 X |
| 3,771,554 | 11/1973 | Hassall | 137/625.3 X |
| 3,853,146 | 12/1974 | Blair | 137/625.3 X |
| 4,384,592 | 5/1983 | Ng | 137/625.3 X |
| 4,397,331 | 8/1983 | Medlar | 137/625.3 X |

Primary Examiner—Alan Cohan
Attorney, Agent, or Firm—Asian Pacific Int'l. Patent and Trademark Office

[57] ABSTRACT

A water pressure-sealing faucet including a sleeve body having a lower outlet opening, provided with inlet holes the diameters of which are reduced downward, and a controlling valve slidably received in the sleeve body, having a lower controlling pin grooved with upward tapered outlet channels and slidably inserted into the outlet opening of the sleeve body, wherein the allowable water flow cross section of the outlet channels is always larger than that of the inlet holes in area whereby when the controlling valve is pulled upward, the water will flow through the sleeve body gradually without sudden change of water pressure to eliminate water hammer effect for protecting water pipe line from damage.

5 Claims, 4 Drawing Sheets

WATER PRESSURE-SEALING FAUCET WITHOUT WATER HAMMER EFFECT

BACKGROUND OF THE INVENTION

A conventional faucet seals up water flow by means of a rotating valve stem to closely oppose a water seal packing against an inlet pipe of a faucet casing. The water seal packing suffers from the water pressure as well as the twisting stress applied by the valve stem, and is apt to be distorted and worn out. Additionally, a water seal ring must be disposed on the joint between the valve stem and valve cap to prevent leakage. Such a water seal ring is also easily damaged due to rotation of the valve stem. Therefore, leakage is often found in the above two places of a conventional faucet.

While a water pressure-sealing faucet applies water pressure itself to seal up water flow, and thus the water seal packing thereof stands much smaller stress and is not so easily worn out. Furthermore, the valve stem of a water pressure-sealing faucet only linearly slides without rotation. Thus, the water seal ring disposed around the valve stem bears smaller frictional force and performs desirable sealing function during a longer period of time.

However, not like a conventional faucet the water pressure-sealing faucet as described above shuts off water flow so quickly that the running water flow stops abruptly to cause considerable water hammer effect, which greatly tends to damage the water pipe line.

Therefor, a water pressure-sealing faucet without water hammer effect is needed to eliminate the aforesaid disadvantages.

SUMMARY OF THE INVENTION

It is a primary object of the present invention to provide a water pressure-sealing faucet which is capable of performing excellent water sealing function without leakage and water hammer effect.

It is a further object of the present invention to provide the above faucet, the components of which can be easily disassembled or assembled whereby any damaged parts can be replaced individually without renewing the whole set of faucet components.

The invention can be best understood through the following description with reference to the accompanying drawings wherein:

DETAILED DESCRIPTION OF THE PREFERRED EMBODIMENT

Figure 1:
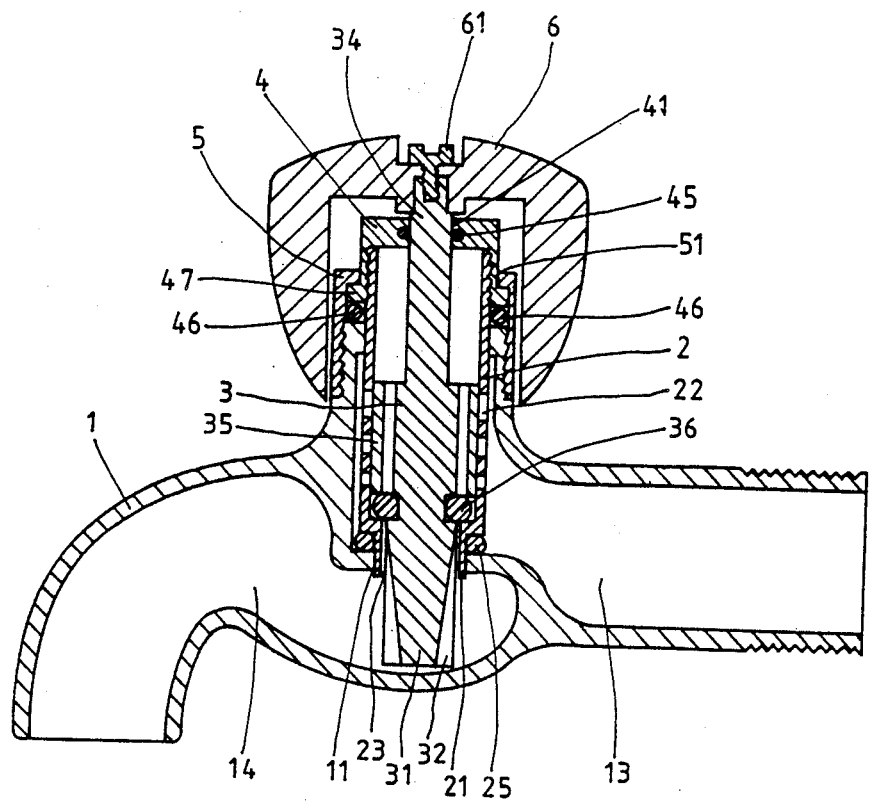
FIG. 1 is a longitudinal sectional view of the faucet of the present invention when closed.
Figure 2:
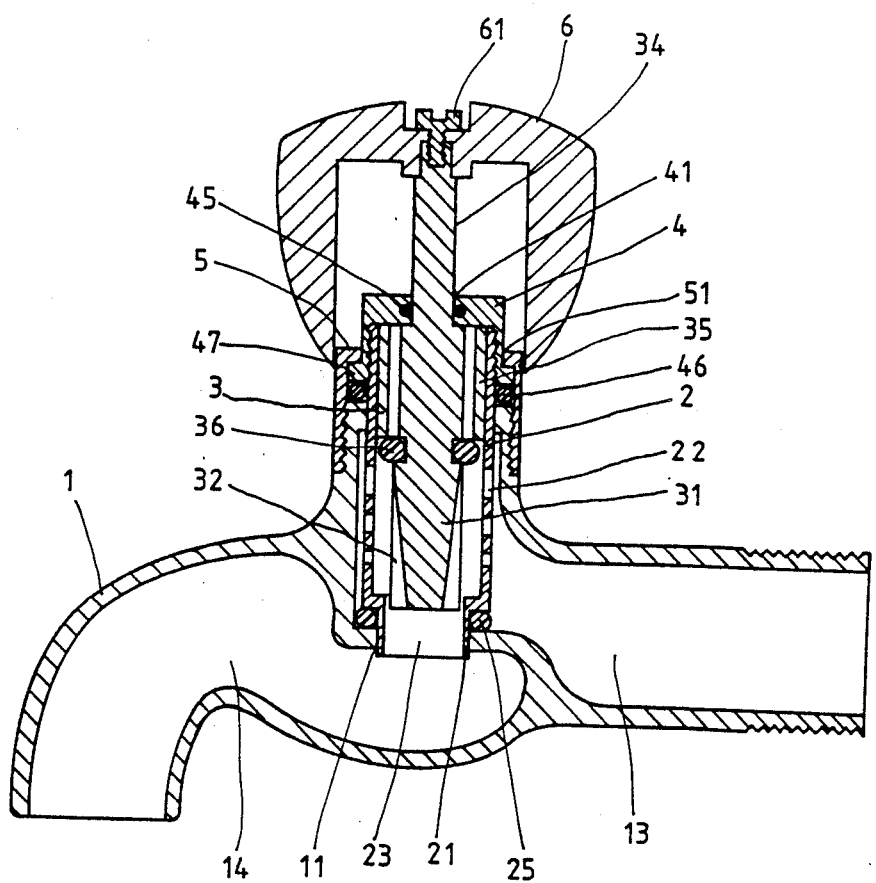
FIG. 2 is a longitudinal sectional view according to FIG. 1 when opened.
Figure 3:
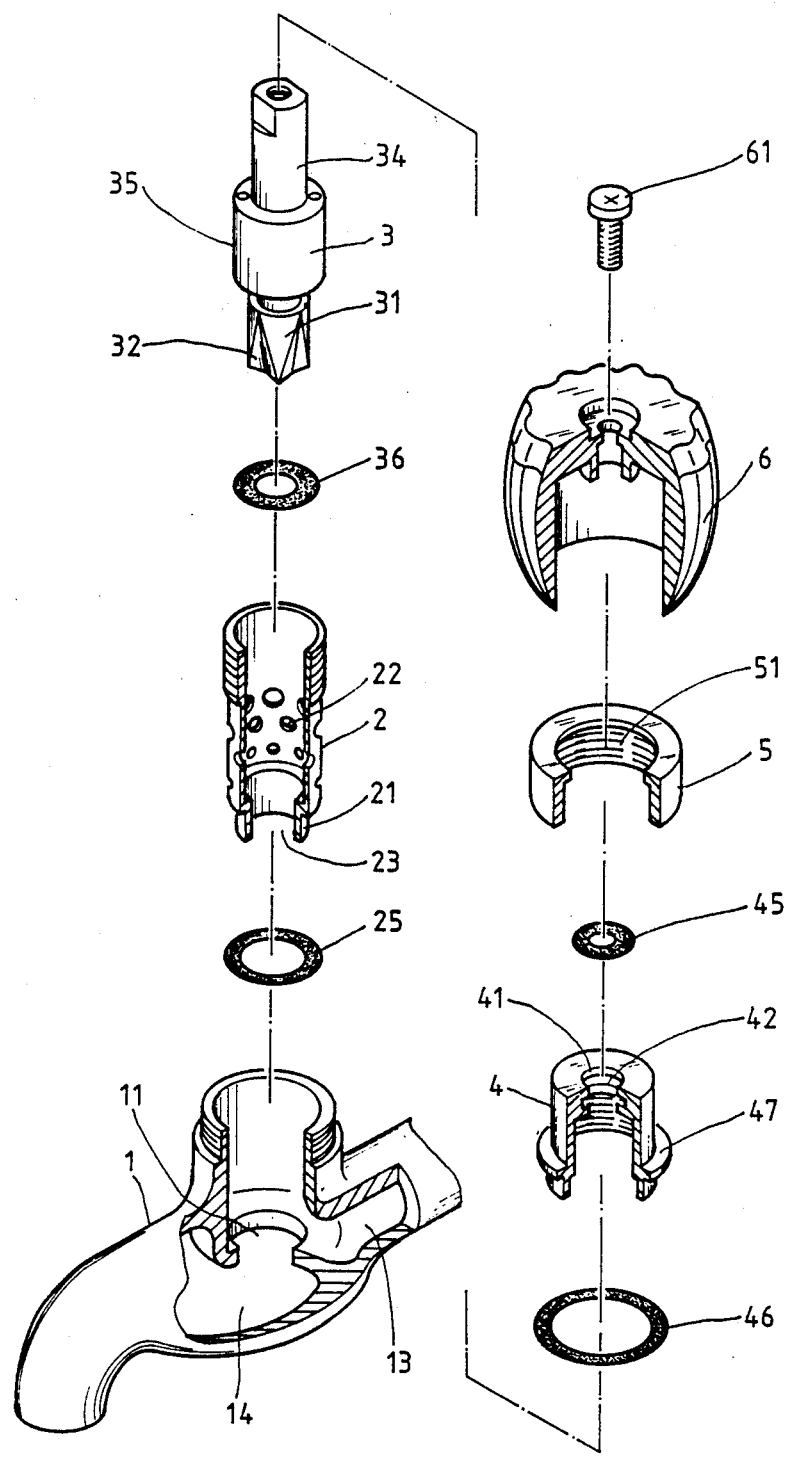
FIG. 3 is an exploded view of the faucet of the present invention.

Please refer to FIGS. 1, 2 and 3. The faucet of the 30 6 present invention includes a faucet casing 1, sleeve body 2, controlling valve 3, a valve guide retainer 4, a securing retainer 5, and a handle 6.

The faucet casing 1 includes an inlet pipe 13 and an outlet pipe 14 communicated with the inlet pipe 13 through a communication opening 11 permitting water to flow downward.

The controlling valve 3 includes a valve body 35 having a lower controlling pin 31 ringed by a seal ring 36, and a valve stem 34 going through a guide hole 41 of the valve guide retainer 4 and a central hole 51 of the securing retainer 5 to engage with the handle 6 via a screw 61.

The valve body 35 is received in the sleeve body 2 to vertically slidably associate the controlling valve 3 with the sleeve body 2 whereby when valve 3 is pressed downward to its lowest position as shown in FIG. 1, water flow into the outlet pipe 14 is shut off by means of its own water pressure.

The sleeve body 2 is provided with several inlet holes 22 the diameters of which are reduced downward. A stepped outlet opening pipe or flow tube 21 ringed by an O-ring 25 is formed at the lower end of the sleeve body 2 to define an outlet opening 23. The stepped outlet opening pipe 21 is inserted into the communication opening 11 with the O-ring 25 packed therearound to seal against possible leakage. The upper end of tube 21 constitutes an internal valve seat.

The controlling pin 31 is grooved with several upwardly tapered outlet channels or grooves 32. Pin 31 is slidably inserted into the outlet opening 23 with the seal ring 36 opposed against the step portion (valve seat) of the outlet opening pipe 21.

According to the aforesaid arrangement, when the valve body 35 as well as the controlling pin 31 are pulled upward by means of pulling the handle 6 together with the valve 30 stem 34 upward as shown in FIG. 2, the inlet holes 22 are sequentially opened from smaller diameter ones to larger diameter ones, permitting water to flow from the inlet pipe 13 into the sleeve body 2 gradually. Similarly, the outlet opening 23 is gradually freed from blockage by the controlling pin 31. The upwardly tapered outlet channels 32 move upwardly through the outlet opening pipe 21 to allow entering water to flow into the outlet pipe 14 through the outlet channels grooves) 32.

The inlet holes 22 and outlet channels 32 are designed in such a manner that the outflow allowable cross section of outlet channels 32 is always larger than the inflow allowable cross section of inlet holes 22 in area whereby the water pressure is relieved to eliminate water hammer effect.

The valve stem 34 is ringed by a water seal ring 45 disposed in an annular recess 42 (FIG. 3) located around the guide hole 41 of the valve guide retainer 4 to prevent leakage between the valve stem 34 and valve guide retainer 4. The valve guide retainer 4 is screwed on the sleeve body 2 An water seal packing 46 is further disposed around the sleeve body 2 and packed between the flange 47 of the valve guide retainer 4 and the upper end of the faucet casing 1, and a securing retainer 15 is screwed on the faucet casing 1 to seal up possible leakage through the gap between faucet casing 1 and sleeve body 2.

Figure 4:
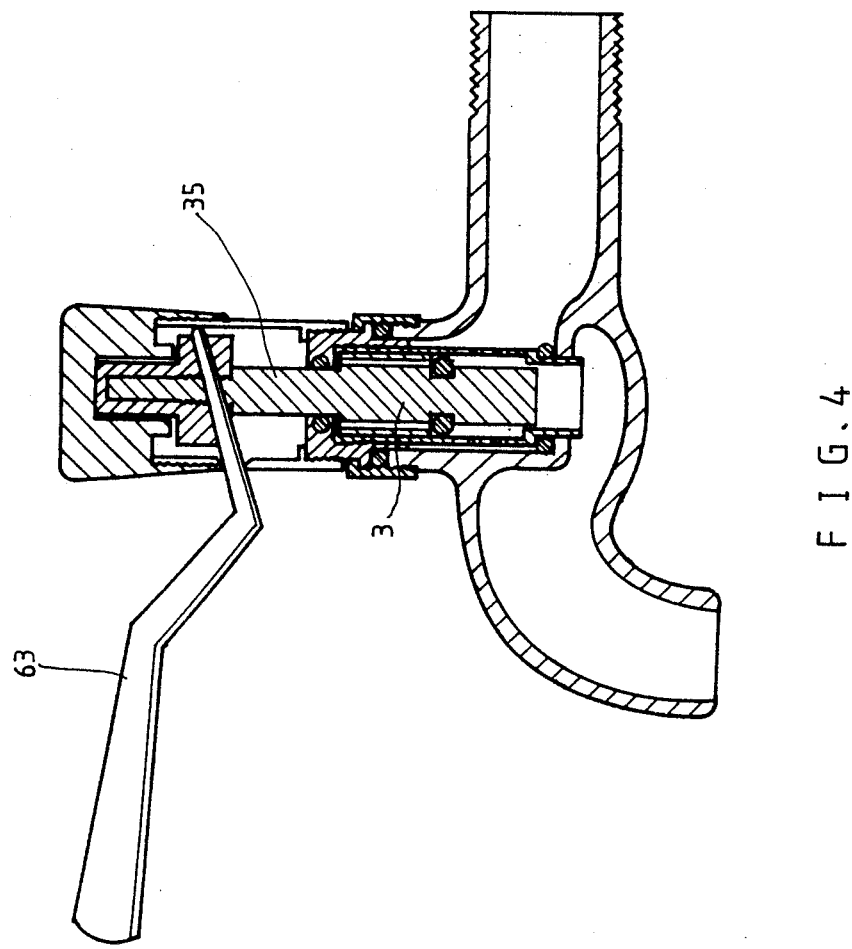
FIG. 4 is a longitudinal sectional view of another embodiment of the present invention.

Another embodiment of the present invention is shown in FIG. 4. An extensive lever 63 going through the faucet casing 1 is secured to the valve stem 35 for operating the controlling valve 3.

What is claimed is:

1. A water pressure-sealing faucet adapted to minimize water hammer action, comprising:
   a faucet casing that includes an inlet pipe (13), an outlet pipe (14), and a communication opening (11)

therebetween; a sleeve (2) located within said inlet pipe, a flow tube (21) extending from said sleeve through said communication opening; the juncture between said sleeve and tube defining an internal valve seat; a series of flow holes (22) spaced along the length of said sleeve for conveying liquid from the inlet pipe into the sleeve;

a cylindrical valve body (35) slidably engaging the inner surface of said sleeve for axial movement toward or away from said valve seat; a cylindrical pin (31) extending from said valve body through the aforementioned flow tube so that when the valve body is spaced axially from the valve seat liquid can flow from the flow holes through the flow tube along the side surface of the pin;

a sealing ring (36) carried on the valve body for sealing engagement with the valve seat to prevent liquid flow into the flow tube;

and a number of flow grooves (32) extending along the pin side surface, each flow groove having a progressively increasing cross section taken in a direction away from the sealing ring (36).

2. The faucet of claim 1, wherein said flow holes (22) and flow grooves (32) are sized so that when the valve body (35) is spaced from the valve seat the total cross sectional area of the flow holes is greater than the cross sectional area of the flow path along the pin side surface.

3. The faucet of claim 1, wherein the flow holes are of progressively increasing area measured in a direction extending away from valve seat along the length of the sleeve.

4. The faucet of claim 1, and further comprising a second sealing ring (25) extending around the outer surface of the flow tube within the inlet pipe (13) to seal the joint between the flow tube and the associated opening (11).

5. The faucet of claim 1, and further comprising an annular packing (46) between the outer surface of said sleeve (2) and the faucet casing so that liquid can flow from the inlet pipe into the sleeve only through the flow holes (22).

* * * * *